United States Patent
Park et al.

(10) Patent No.: US 12,534,545 B2
(45) Date of Patent: Jan. 27, 2026

(54) PROCESS FOR PREPARING A HYBRID CATALYST FOR OLEFIN POLYMERIZATION, HYBRID CATALYST FOR OLEFIN POLYMERIZATION, AND POLYOLEFIN

(71) Applicant: HANWHA SOLUTIONS CORPORATION, Seoul (KR)

(72) Inventors: Hye Ran Park, Daejeon (KR); Sung Dong Kim, Daejeon (KR); Junho Seo, Daejeon (KR); Munhee Lee, Daejeon (KR); Ui Gap Joung, Daejeon (KR); Tae Uk Jeong, Daejeon (KR); Seongjae Lim, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 916 days.

(21) Appl. No.: 17/768,221

(22) PCT Filed: Oct. 8, 2020

(86) PCT No.: PCT/KR2020/013701
§ 371 (c)(1),
(2) Date: Apr. 12, 2022

(87) PCT Pub. No.: WO2021/075788
PCT Pub. Date: Apr. 22, 2021

(65) Prior Publication Data
US 2023/0331877 A1    Oct. 19, 2023

(30) Foreign Application Priority Data

Oct. 16, 2019 (KR) .................. 10-2019-0128663

(51) Int. Cl.
| | | |
|---|---|---|
| *C08F 4/65* | (2006.01) | |
| *C08F 4/659* | (2006.01) | |
| *C08F 4/6592* | (2006.01) | |
| *C08F 210/16* | (2006.01) | |

(52) U.S. Cl.
CPC ...... *C08F 4/65916* (2013.01); *C08F 4/65904* (2013.01); *C08F 4/65912* (2013.01); *C08F 4/65925* (2013.01); *C08F 210/16* (2013.01)

(58) Field of Classification Search
CPC .............. C08F 4/65916; C08F 4/65904; C08F 4/65912; C08F 4/64089; C08F 4/65908; C08F 4/65925; C07F 7/00; C07F 17/00
See application file for complete search history.

(56) References Cited

U.S. PATENT DOCUMENTS

2022/0161141 A1    5/2022    Kulavik

FOREIGN PATENT DOCUMENTS

| | | |
|---|---|---|
| JP | 2019-515997 A | 6/2019 |
| KR | 1020000042620 A | 7/2000 |
| KR | 1020130116395 A | 10/2013 |
| KR | 1020160112424 A | 9/2016 |
| KR | 10-2019-0078588 A | 7/2019 |
| WO | 2019046085 A1 | 3/2019 |
| WO | 2019190898 A1 | 10/2019 |

OTHER PUBLICATIONS

International Search Report dated Jan. 22, 2021.
The Extended European search report issued on Oct. 17, 2023 for corresponding EP Patent Application.
An office action issued on Apr. 14, 2023, for corresponding KR Patent Application.
KR Office Action Dated Oct. 6, 2022.

*Primary Examiner* — Catherine S Branch
(74) *Attorney, Agent, or Firm* — Harvest IP Law, LLP

(57) ABSTRACT

The present invention relates to a process for preparing a hybrid catalyst for olefin polymerization, to a hybrid catalyst for olefin polymerization, and to a polyolefin. The supported hybrid metallocene catalyst for olefin polymerization prepared by the process for preparing a supported hybrid metallocene catalyst for olefin polymerization according to an embodiment of the present invention is capable of preparing a polyolefin having a broad molecular weight distribution of bimodal characteristics and being excellent in mechanical strength and processability.

16 Claims, No Drawings

PROCESS FOR PREPARING A HYBRID CATALYST FOR OLEFIN POLYMERIZATION, HYBRID CATALYST FOR OLEFIN POLYMERIZATION, AND POLYOLEFIN

CROSS-REFERENCE TO RELATED APPLICATIONS

This application is a National Stage of International Application No. PCT/KR2020/013701 filed Oct. 8, 2020, claiming priority based on Korean Patent Application No. 10-2019-0128663 filed Oct. 16, 2019, the disclosure of which is incorporated herein by reference in its entirety.

TECHNICAL FIELD

The present invention relates to a process for preparing a hybrid catalyst for olefin polymerization, to a hybrid catalyst for olefin polymerization, and to a polyolefin. Specifically, the present invention relates to a process for preparing a supported hybrid metallocene catalyst for olefin polymerization to prepare a polyolefin having a broad molecular weight distribution of bimodal characteristics, to a supported hybrid metallocene catalyst for olefin polymerization prepared using the same, and to a polyolefin polymerized in the presence of the catalyst.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution and a uniform distribution of comonomers.

Polyolefins having a narrow molecular weight distribution may have disadvantages in that the pressure increases during extrusion, resulting in decreased productivity, and that the quality of the molded article is not uniform. In order to improve these disadvantages, attempts have been made to develop polyolefins having a broad molecular weight distribution using hybrid metallocene compounds comprising two or more transition metal compounds (see, e.g., U.S. Pat. No. 4,935,474).

Although polyolefins having a wide molecular weight distribution generally tend to show excellent processability, these polyolefins often do not have sufficient mechanical properties.

Accordingly, there is a demand for a process for preparing a supported hybrid metallocene catalyst capable of producing polyolefins having excellent mechanical strength and excellent processability.

DETAILED DESCRIPTION OF THE INVENTION

Technical Problem

An object of the present invention is to provide a process for preparing a supported hybrid metallocene catalyst capable of preparing a polyolefin having a broad molecular weight distribution of bimodal characteristics and being excellent in mechanical strength and processability.

Another object of the present invention is to provide a supported hybrid metallocene catalyst for olefin polymerization prepared by the above preparation process.

Still another object of the present invention is to provide a polyolefin having a broad molecular weight distribution of bimodal characteristics and being excellent in mechanical strength and processability.

Technical Solution

According to an embodiment of the present invention to accomplish the object, there is provided a process for preparing a supported hybrid metallocene catalyst for olefin polymerization, which comprises (1) mixing a first transition metal compound represented by Formula 1 with a first cocatalyst compound; (2) supporting the mixture of the first transition metal compound and the first cocatalyst compound obtained in step (1) on a carrier; and (3) mixing the supported catalyst obtained in step (2) with (3a) a mixture of a second transition metal compound represented by Formula 2 and a second cocatalyst compound, or (3b) a second transition metal compound represented by Formula 2, which is then mixed with a second cocatalyst compound, or (3c) a second cocatalyst compound, which is then mixed with a second transition metal compound represented by Formula 2.

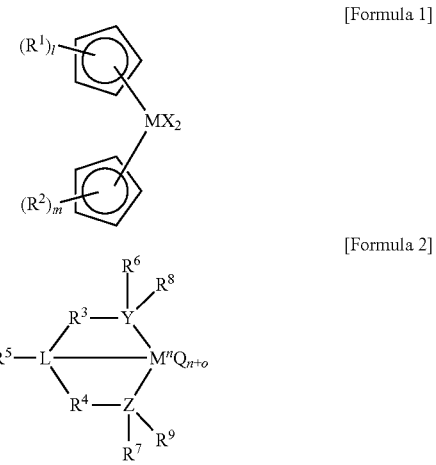

[Formula 1]

[Formula 2]

In Formulae 1 and 2, M is each independently titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, l and m are each an integer from 0 to 5, $R^1$ and $R^2$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R^1$ and $R^2$ are each independently capable of being linked to adjacent groups to form a substituted or unsubstituted saturated or unsaturated $C_{4-20}$ ring, Q is an anionic leaving group and is each independently hydrogen, hydrocarbyl, heteroatom or halogen, a straight or branched chain alkyl radical, or an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof, n is the oxidation state of M and is +3, +4, or +5, o is the formal charge of the YZL ligand and is 0, −1, −2, or −3, L is a group 15 or 16 element, preferably nitrogen, Y is a group 15 element, preferably nitrogen or phosphorus, more preferably nitrogen, Z is a group 15 element, preferably nitrogen or phosphorus, more preferably nitrogen, $R^3$ and $R^4$ are each independently a $C_{1-20}$ hydrocarbon group or a heteroatom-containing group, wherein the hetero atom is silicon, germanium, tin, lead, or phosphorus, or $R^3$ and $R^4$ are capable of being linked to each other, $R^5$ is absent or is hydrogen, $C_{1-20}$ alkyl, halogen, or a heteroatom-containing group, $R^6$ and $R^7$ are each independently an alkyl group, an aryl group, a substituted aryl group, a cyclic alkyl group, a substituted cyclic alkyl group, or a multiple ring system, and $R^8$ and $R^9$ are each independently absent, or hydrogen, an alkyl group, a halogen, a heteroatom, a hydrocarbyl group, or a heteroatom-containing group.

Preferably, in Formula 1, M is zirconium or hafnium, X is each independently halogen, and l and m are each an integer of 1 to 3, and in Formula 2, M is zirconium or hafnium, Q is each independently hydrogen, a halogen, or a hydrocarbyl group, $R^3$ and $R^4$ are each independently a $C_{1-6}$ hydrocarbon group, $R^5$ is hydrogen or methyl, and $R^6$ and $R^7$ are each independently a substituted aryl group.

More preferably, in Formula 2, $R^6$ and $R^7$ are each independently a group represented by Formula 3.

[Formula 3]

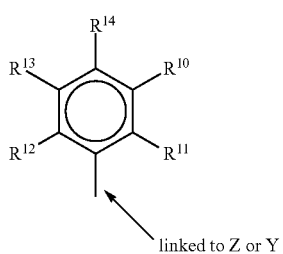

linked to Z or Y

In Formula 3, $R^{10}$ to $R^{14}$ are each independently hydrogen, a $C_{1-20}$ alkyl group, a hetero atom, or a heteroatom-containing group having up to 40 carbon atoms, and two groups of $R^{10}$ to $R^{14}$ may be fused to form a cyclic group or a heterocyclic group.

More preferably, in Formula 3, $R^{11}$, $R^{12}$, and $R^{14}$ are methyl, and $R^{10}$ and $R^{13}$ are hydrogen Most preferably, the first transition metal compound and the second transition metal compound are compounds represented by Formula 1a and Formula 2a, respectively.

[Formula 1a]

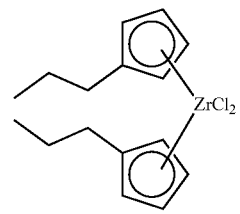

[Formula 2a]

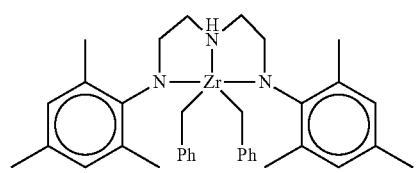

In Formula 2a, Ph is a phenyl group.

Meanwhile, the first cocatalyst compound and the second cocatalyst compound may each comprise at least one selected from the group consisting of a compound represented by Formula 4, a compound represented by Formula 5, and a compound represented by Formula 6.

[Formula 4]

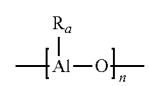

[Formula 5]

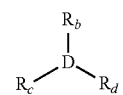

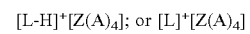  [Formula 6]

In Formula 4, n is an integer of 2 or more, and $R^a$ may each independently be a halogen atom, a hydrocarbon group having 1-20 carbon atoms, or a hydrocarbon group having 1-20 carbon atoms substituted with halogen, in Formula 5, D is aluminum (Al) or boron, and $R^b$, $R^c$, and $R^d$ are each independently a halogen atom, a hydrocarbon group having 1-20 carbon atoms, a hydrocarbon group having 1-20 carbon atoms substituted with halogen, or an alkoxy group having 1-20 carbon atoms, and in Formula 6, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms.

Specifically, the compound represented by Formula 4 is at least one selected from the group consisting of methylaluminoxane, ethylaluminoxane, isobutylaluminoxane, and butylaluminoxane.

In addition, the compound represented by Formula 5 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 6 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl) borate, triphenylcarbonium tetra(p-trifluoromethylphenyl)borate, and triphenylcarbonium tetrapentafluorophenylborate.

Preferably, the first cocatalyst compound and the second cocatalyst compound are the same.

More preferably, the first cocatalyst compound and the second cocatalyst compound are methylaluminoxane.

In a specific embodiment, the carrier may comprise at least one selected from the group consisting of silica, alumina, and magnesia.

Preferably, the first transition metal compound, the second transition metal compound, the first cocatalyst compound, and the second cocatalyst compound may be supported on a single carrier. Specifically, the first transition metal compound, the second transition metal compound, the first cocatalyst compound, and the second cocatalyst compound may be supported on silica.

In such an event, the first transition metal compound and the second transition metal compound may be supported such that the respective central metals are 0.01 to 0.20% by weight and 0.15 to 0.50% by weight based on the total weight of the finally obtained supported catalyst.

According to another embodiment of the present invention, there is provided a supported hybrid metallocene catalyst for olefin polymerization, which is prepared by the process for preparing a supported hybrid metallocene catalyst for olefin polymerization, and which comprises a first transition metal compound represented by Formula 1; a second transition metal compound represented by Formula 2; a first cocatalyst compound; a second cocatalyst compound; and a carrier, wherein the contents of the central metals of the first transition metal compound and the second transition metal compound are 0.01 to 0.20% by weight and 0.15 to 0.50% by weight, respectively, based on the total amount of the finally obtained supported catalyst.

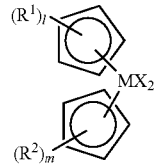

[Formula 1]

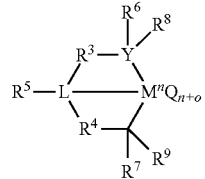

[Formula 2]

In Formulae 1 and 2, M, X, l, m, Q, n, o, L, Y, Z, $R^1$ to $R^9$ are as defined above.

According to still another embodiment of the present invention, there is provided a polyolefin, which is prepared in the presence of the catalyst for olefin polymerization, and which has a density of 0.88 to 0.96 g/cm³, a melt index ($I_{2.16}$) of 0.1 g/10 minutes or less as measured at 190° C. under a load of 2.16 kg, and a melt flow ratio (MFR) of 100 or more as a ratio of a melt index ($I_{21.6}$) as measured under a load of 21.6 kg to a melt index ($I_{2.16}$) as measured under a load of 2.16 kg at 190° C.

Specifically, the polyolefin may be a copolymer of an olefinic monomer and an alpha-olefinic comonomer. More specifically, the olefinic monomer may be ethylene, and the alpha-olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

Preferably, the polyolefin may be a linear low-density polyethylene in which the olefinic monomer is ethylene, and the alpha-olefinic comonomer is 1-hexene.

Advantageous Effects of the Invention

The supported hybrid metallocene catalyst for olefin polymerization prepared by the process for preparing a supported hybrid metallocene catalyst for olefin polymerization according to an embodiment of the present invention is capable of preparing a polyolefin having a broad molecular weight distribution of bimodal characteristics and being excellent in mechanical strength and processability. In addition, in the process for preparing a supported hybrid metallocene catalyst for olefin polymerization according to an embodiment of the present invention, it is possible to adjust the strength, processability, and the like of a polyolefin to be prepared by changing the contents of the respective transition metal compounds.

BEST MODE FOR CARRYING OUT THE INVENTION

Hereinafter, the present invention will be described in more detail.

Process for Preparing a Supported Hybrid Metallocene Catalyst for Olefin Polymerization The process for preparing a supported hybrid metallocene catalyst for olefin polymerization according to an embodiment of the present invention comprises (1) mixing a first transition metal compound represented by Formula 1 with a first cocatalyst compound; (2) supporting the mixture of the first transition metal compound and the first cocatalyst compound obtained in step (1) on a carrier; and (3) mixing the supported catalyst obtained in step (2) with (3a) a mixture of a second transition metal compound represented by Formula 2 and a second cocatalyst compound, or (3b) a second transition metal compound represented by Formula 2, which is then mixed with a second cocatalyst compound, or (3c) a second cocatalyst compound, which is then mixed with a second transition metal compound represented by Formula 2.

Step (1)

In step (1), a first transition metal compound represented by Formula 1 is mixed with a first cocatalyst compound. In such an event, the first transition metal compound is activated upon mixing with the first cocatalyst compound.

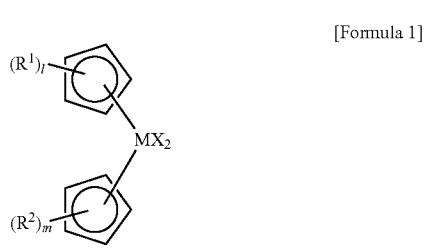
[Formula 1]

In Formula 1, M is a transition metal of Group 4 of the Periodic Table of the Elements. Specifically, M may be titanium (Ti), zirconium (Zr), or hafnium (Hf), more specifically, zirconium or hafnium.

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene. Specifically, X may each independently be halogen, more specifically, chlorine (Cl).

l and m are each an integer from 0 to 5. Specifically, l and m may each be an integer from 1 to 3.

$R^1$ and $R^2$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R^1$ and $R^2$ are each independently capable of being linked to adjacent groups to form a substituted or unsubstituted saturated or unsaturated $C_{4-20}$ ring.

Most preferably, the transition metal compound represented by Formula 1 may be a compound represented by Formula 1a.

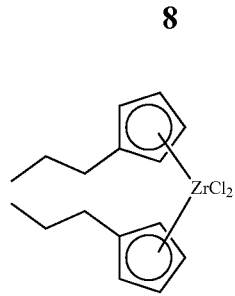
[Formula 1a]

Meanwhile, the first cocatalyst compound may comprise at least one of a compound represented by Formula 4, a compound represented by Formula 5, and a compound represented by Formula 6.

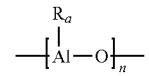
[Formula 4]

In Formula 4, n is an integer of 2 or more, and $R_a$ may each independently be a halogen atom, a hydrocarbon group having 1-20 carbon atoms, or a hydrocarbon group having 1-20 carbon atoms substituted with halogen. Specifically, $R_a$ may be methyl, ethyl, n-butyl, or isobutyl.

[Formula 5]

In Formula 5, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$[L-H]^+[Z(A)_4]^-$ or $[L]^+[Z(A)_4]^-$     [Formula 6]

In Formula 6, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms. Specifically, $[LH]^+$ may be a dimethylanilinium cation, $[Z(A)^+]$ may be $[B(C_6F_5)_4]^-$, and $[L]^+$ may be $[(C_6H_5)_3C]^+$.

Examples of the compound represented by Formula 4 include methylaluminoxane, ethylaluminoxane, isobutylaluminoxane, butylaluminoxane, and the like. Preferred is methylaluminoxane, but it is not limited thereto.

Examples of the compound represented by Formula 5 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum, but it is not limited thereto.

Examples of the compound represented by Formula 6 include triethylammonium tetraphenylborate, tributylammonium tetraphenylborate, trimethylammonium tetraphenylborate, tripropylammonium tetraphenylborate, trimethylammonium tetra(p-tolyl) borate, trimethylammonium tetra(o,p-dimethylphenyl)borate, tributylammonium tetra(p-trifluoromethylphenyl)borate, trimethylammonium tetra(p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

The procedure in which the first transition metal compound is mixed with the first cocatalyst compound in step (1) may be carried out in the presence of a solvent. Here, the solvent may be most organic solvents including aliphatic hydrocarbon solvents such as hexane and pentane, aromatic hydrocarbon solvents such as toluene and benzene, hydrocarbon solvents substituted with chlorine atoms such as dichloromethane, ether-based solvents such as diethyl ether and tetrahydrofuran, acetone, and ethyl acetate. Preferred is toluene or hexane, but it is not particularly limited thereto.

The procedure in which the first transition metal compound is mixed with the first cocatalyst compound in step (1) may be carried out at a temperature of 0 to 100° C., preferably at a temperature of 10 to 80° C.

In addition, once the first transition metal compound has been mixed with the first cocatalyst compound in step (1), it is preferably sufficiently stirred for 5 minutes to 24 hours, more preferably 30 minutes to 3 hours.

Step (2)

In step (2), the mixture of the first transition metal compound and the first cocatalyst compound obtained in step (1) is supported on a carrier.

Here, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not particularly limited thereto.

The carrier may have an average particle size of 10 to 250 μm, preferably an average particle size of 10 to 150 μm, and more preferably 20 to 100 μm.

The carrier may have a micropore volume of 0.1 to 10 ml/g, preferably 0.5 to 5 ml/g, and more preferably 1.0 to 3.0 ml/g.

The carrier may have a specific surface area of 1 to 1,000 $m^2/g$, preferably 100 to $m^2/g$, more preferably 200 to 600 $m^2/g$.

In a preferred example, when the carrier is silica, the drying temperature of the silica may be 200 to 900° C. The drying temperature may preferably be 300 to 800° C., more preferably 400 to 700° C. If the drying temperature is lower than 200° C., there would be too much moisture so that the moisture on the surface and the first cocatalyst may react. If it exceeds 900° C., the structure of the carrier may collapse.

The dried silica may have a concentration of hydroxy groups of 0.1 to 5 mmole/g, preferably 0.7 to 4 mmole/g, and more preferably 1.0 to 2 mmole/g. If the concentration of hydroxy groups is less than 0.1 mmole/g, the supported amount of the first cocatalyst may be low. If it exceeds 5 mmole/g, there may arise a problem that the catalyst component may be deactivated.

The procedure in which a mixture of the first transition metal compound and the first cocatalyst compound is contacted with the carrier in step (2) may be carried out in the presence of a solvent. Here, details on the solvent are substantially the same as those described in step (1) above.

The procedure in which a mixture of the first transition metal compound and the first cocatalyst compound is contacted with the carrier in step (2) may be carried out at a temperature of 0 to 100° C., preferably at a temperature of 10 to 80° C.

In addition, once a mixture of the first transition metal compound and the first cocatalyst compound has been contacted with the carrier in step (2), it is preferably sufficiently stirred for 5 minutes to 24 hours, more preferably 30 minutes to 3 hours.

Step (3)

In step (3), the supported catalyst obtained in step (2) is mixed with (3a) a mixture of a second transition metal compound represented by Formula 2 and a second cocatalyst compound, or (3b) a second transition metal compound represented by Formula 2, which is then mixed with a second cocatalyst compound, or (3c) a second cocatalyst compound, which is then mixed with a second transition metal compound represented by Formula 2.

Step (3a)

As a specific example of step (3), (3a) the supported catalyst obtained in step (2) may be mixed with a mixture of a second transition metal compound represented by Formula 2 and a second cocatalyst compound.

[Formula 2]

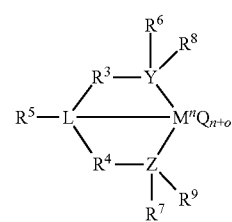

In Formula 2, M is a transition metal of Group 4 of the Periodic Table of the Elements. Specifically, M may be titanium (Ti), zirconium (Zr), or hafnium (Hf), more specifically, zirconium or hafnium.

Q is an anionic leaving group and is each independently hydrogen, hydrocarbyl, heteroatom or halogen, a straight or branched chain alkyl radical, or an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof. Specifically, Q may each independently be a hydrogen, halogen, or a hydrocarbyl group.

n is the oxidation state of M and is +3, +4, or +5.

o is the formal charge of the YZL ligand and is 0, −1, −2, or −3.

L is a group 15 or 16 element, preferably nitrogen.

Y is a group 15 element, preferably nitrogen or phosphorus, more preferably nitrogen.

Z is a group 15 element, preferably nitrogen or phosphorus, more preferably nitrogen.

$R^3$ and $R^4$ are each independently a $C_{1-20}$ hydrocarbon group or a heteroatom-containing group, wherein the hetero atom is silicon, germanium, tin, lead, or phosphorus, or $R^3$ and $R^4$ are capable of being linked to each other. Specifically, $R^3$ and $R_4$ may each independently be a $C_{1-6}$ hydrocarbon group.

$R^5$ is absent or is hydrogen, $C_{1-20}$ alkyl, halogen, or a heteroatom-containing group. Specifically, $R^5$ may be hydrogen or methyl.

$R^6$ and $R^7$ are each independently an alkyl group, an aryl group, a substituted aryl group, a cyclic alkyl group, a substituted cyclic alkyl group, or a multiple ring system. Specifically, $R^6$ and $R^7$ may each independently be a substituted aryl group.

$R^8$ and $R^9$ are each independently absent, or hydrogen, an alkyl group, a halogen, a heteroatom, a hydrocarbyl group, or a heteroatom-containing group.

Preferably, in Formula 2, $R^6$ and $R^7$ may each independently be a group represented by Formula 3.

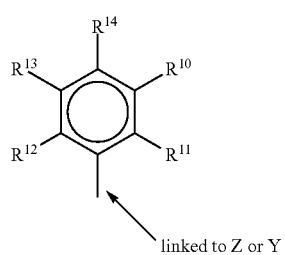

[Formula 3]

linked to Z or Y

In Formula 3, $R^{10}$ to $R^{14}$ are each independently hydrogen, a $C_{1-20}$ alkyl group, a hetero atom, or a heteroatom-containing group having up to 40 carbon atoms, and two groups of $R^{10}$ to $R^{14}$ are capable of being fused to form a cyclic group or a heterocyclic group.

More preferably, in Formula 3, $R^{11}$, $R^{12}$, and $R^{14}$ are methyl, and $R^{10}$ and $R^{13}$ are hydrogen Most preferably, the second transition metal compound represented by Formula 2 may be a compound represented by Formula 2a.

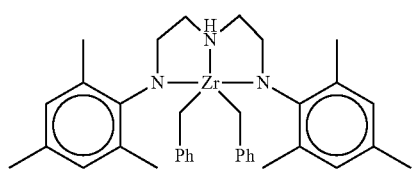

[Formula 2a]

In Formula 2a, Ph is a phenyl group.

Meanwhile, the second cocatalyst compound may comprise at least one of a compound represented by Formula 4, a compound represented by Formula 5, and a compound represented by Formula 6. Details on the compounds represented by Formulae 4, 5, and 6 are substantially the same as those described in step (1) above.

The procedure in which the second transition metal compound represented by Formula 2 is mixed with the second cocatalyst compound in step (3a) may be carried out in the presence of a solvent. Here, details on the solvent are substantially the same as those described in step (1) above.

The procedure in which the second transition metal compound is mixed with the second cocatalyst compound in step (3a) may be carried out at a temperature of 0 to 100° C., preferably at a temperature of 10 to 80° C.

In addition, once the second transition metal compound and the second cocatalyst compound have been mixed in step (3a), it is preferably sufficiently stirred for 5 minutes to 24 hours, more preferably 30 minutes to 3 hours.

The procedure in which the supported catalyst obtained in step (2) is mixed with a mixture of the second transition metal compound and the second cocatalyst compound in step (3a) may be carried out in the presence of a solvent. Here, details on the solvent are substantially the same as those described in step (1) above.

The procedure in which the supported catalyst obtained in step (2) is mixed with a mixture of the second transition metal compound and the second cocatalyst compound in step (3a) may be carried out at a temperature of 0 to 100° C., preferably at a temperature of 10 to 80° C.

In addition, once the supported catalyst obtained in step (2) has been mixed with a mixture of the second transition metal compound and the second cocatalyst compound in step (3a), it is preferably sufficiently stirred for 5 minutes to 24 hours, more preferably 30 minutes to 3 hours.

Step (3b)

As a specific example of step (3), (3b) the supported catalyst obtained in step (2) may be mixed with a second transition metal compound represented by Formula 2, which may then be mixed with a second cocatalyst compound.

Here, details on the second transition metal compound and the second cocatalyst compound are substantially the same as those described in step (3a) above.

The procedure in which the supported catalyst obtained in step (2) is mixed with the second transition metal compound in step (3a) may be carried out in the presence of a solvent. Here, details on the solvent are substantially the same as those described in step (1) above.

The procedure in which the supported catalyst obtained in step (2) is mixed with the second transition metal compound in step (3a) may be carried out at a temperature of 0 to 100° C., preferably at a temperature of 10 to 80° C.

In addition, once the supported catalyst obtained in step (2) has been mixed with the second transition metal compound in step (3a), it is preferably sufficiently stirred for 5 minutes to 24 hours, more preferably 30 minutes to 3 hours.

The procedure in which a mixture of the supported catalyst obtained in step (2) and the second transition metal compound is mixed with the second cocatalyst compound in step (3b) may be carried out in the presence of a solvent. Here, details on the solvent are substantially the same as those described in step (1) above.

The procedure in which a mixture of the supported catalyst obtained in step (2) and the second transition metal compound is mixed with the second cocatalyst compound in step (3b) may be carried out at a temperature of 0 to 100° C., preferably at a temperature of 10 to 80° C.

In addition, once a mixture of the supported catalyst obtained in step (2) and the second transition metal compound is mixed with the second cocatalyst compound in step (3b), it is preferably sufficiently stirred for 5 minutes to 24 hours, more preferably 30 minutes to 3 hours.

Step (3c)

As a specific example of step (3), (3c) the supported catalyst obtained in step (2) may be mixed with a second cocatalyst compound, which may then be mixed with a second transition metal compound represented by Formula 2.

Here, details on the second transition metal compound and the second cocatalyst compound are substantially the same as those described in step (3a) above.

The procedure in which the supported catalyst obtained in step (2) may be mixed with the second cocatalyst compound in step (3a) may be carried out in the presence of a solvent. Here, details on the solvent are substantially the same as those described in step 50% (1) above.

The procedure in which the supported catalyst obtained in step (2) may be mixed with the second cocatalyst compound in step (3a) may be carried out at a temperature of 0 to 100° C., preferably at a temperature of 10 to 80° C.

In addition, once the supported catalyst obtained in step (2) has been mixed with the second cocatalyst compound in step (3c), it is preferably sufficiently stirred for 5 minutes to 24 hours, more preferably 30 minutes to 3 hours.

The procedure in which a mixture of the supported catalyst obtained in step (2) and the second cocatalyst compound is mixed with the second transition metal compound in step (3c) may be carried out in the presence of a solvent. Here, details on the solvent are substantially the same as those described in step (1) above.

The procedure in which a mixture of the supported catalyst obtained in step (2) and the second cocatalyst compound is mixed with the second transition metal compound in step (3c) may be carried out at a temperature of 0 to 100° C., preferably at a temperature of 10 to 80° C.

In addition, once a mixture of the supported catalyst obtained in step (2) and the second cocatalyst compound is mixed with the second transition metal compound in step (3c), it is preferably sufficiently stirred for 5 minutes to 24 hours, more preferably 30 minutes to 3 hours.

Step (4)

The process for preparing a supported hybrid metallocene catalyst according to an embodiment of the present invention may further comprise (4) washing the supported catalyst with a solvent and drying it.

Specifically, the supported catalyst obtained by supporting the hybrid transition metal compounds on a carrier is allowed to stand for 3 minutes to 3 hours to precipitate the supported catalyst. Subsequently, the supernatant is removed to separate the supported catalyst, which is then washed with a solvent and dried for 6 to 48 hours at a temperature from room temperature to 80° C. to obtain a supported catalyst. Here, the solvent is substantially the same as described in step (1) above.

In a specific embodiment of the present invention, the first cocatalyst compound and the second cocatalyst compound may be the same as, or different from, each other in the hybrid catalyst for olefin polymerization according to an embodiment of the present invention. As a preferred embodiment, the first cocatalyst compound and the second cocatalyst compound may be the same. Specifically, the first cocatalyst compound and the second cocatalyst compound may be methylaluminoxane.

In a specific embodiment of the present invention, the first transition metal compound, the second transition metal compound, the first cocatalyst compound, and the second cocatalyst compound may be supported on a single carrier. Specifically, the first transition metal compound, the second transition metal compound, the first cocatalyst compound, and the second cocatalyst compound may be supported on silica.

In such an event, the first transition metal compound and the second transition metal compound may be supported such that the respective central metals are 0.01 to 0.20% by weight and 0.15 to 0.50% by weight based on the total weight of the finally obtained supported catalyst.

When the contents of the respective central metals of the first transition metal compound and the second transition metal compound are within the above ranges, an appropriate activity of the supported catalyst may be exhibited, which may be advantageous from the viewpoint of maintaining the activity of the catalyst and economic efficiency. Further, a polyolefin prepared in the presence of the catalyst for olefin polymerization, which satisfies the above ranges, has excellent processability, and a film prepared therefrom may have excellent mechanical and optical properties.

Supported Hybrid Metallocene Catalyst for Olefin Polymerization

According to another embodiment of the present invention, there is to provide a supported hybrid metallocene catalyst for olefin polymerization prepared by the above preparation process.

Specifically, the supported hybrid metallocene catalyst for olefin polymerization according to an embodiment of the present invention is prepared by the process for preparing a supported hybrid metallocene catalyst for olefin polymerization, and it comprises a first transition metal compound represented by Formula 1; a second transition metal compound represented by Formula 2; a first cocatalyst compound; a second cocatalyst compound; and a carrier, wherein the contents of the central metals of the first transition metal compound and the second transition metal compound are 0.01 to 0.20% by weight and 0.15 to 0.50% by weight, respectively, based on the total amount of the finally obtained supported catalyst.

[Formula 1]

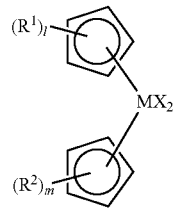

-continued

[Formula 2]

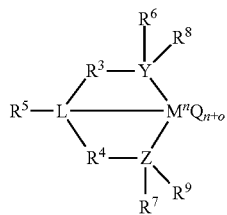

In Formulae 1 and 2, M, X, l, m, Q, n, o, L, Y, Z, $R^1$ to $R^9$ are as defined above. In addition, details on the first cocatalyst compound, second cocatalyst compound, and carrier are substantially the same as those described above in the process for preparing a supported hybrid metallocene catalyst for olefin polymerization.

Polyolefin

According to still another embodiment of the present invention, there is provided a polyolefin prepared by polymerizing an olefinic monomer in the presence of the catalyst for olefin polymerization described above. The polyolefin prepared in the presence of the catalyst for olefin polymerization according to an embodiment of the present invention has a density of 0.88 to 0.96 g/cm³, a melt index ($I_{2.16}$) of 0.1 g/10 minutes or less as measured at 190° C. under a load of 2.16 kg, and a melt flow ratio (MFR) of 100 or more as a ratio of a melt index ($I_{21.6}$) as measured under a load of 21.6 kg to a melt index ($I_{2.16}$) as measured under a load of 2.16 kg at 190° C.

The polyolefin prepared in the presence of the catalyst for olefin polymerization according to an embodiment of the present invention has a density of 0.88 to 0.96 g/cm³. Preferably, the density of the polyolefin may be 0.90 to 0.96 g/cm³ or 0.92 to 0.96 g/cm³.

The polyolefin prepared in the presence of the catalyst for olefin polymerization according to an embodiment of the present invention has a melt index ($I_{2.16}$) of 0.1 g/10 minutes or less as measured at 190° C. under a load of 2.16 kg in accordance with ASTM D 1238. Preferably, the melt index ($I_{2.16}$) of the polyolefin may be 0.01 to 100 mg/10 minutes.

In addition, the polyolefin prepared in the presence of the catalyst for olefin polymerization according to an embodiment of the present invention has a melt flow ratio (MFR) of 100 or more as a ratio of a melt index ($I_{21.6}$) as measured under a load of 21.6 kg to a melt index ($I_{2.16}$) as measured under a load of 2.16 kg at 190° C. in accordance with ASTM D 1238. Preferably, the MFR of the polyolefin may be 100 to 180.

Here, the polyolefin may be a homopolymer of an olefinic monomer or a copolymer of an olefinic monomer and an olefinic comonomer.

The olefinic monomer is at least one selected from the group consisting of an alpha-olefin having 2-20 carbon atoms, a diolefin having 1-20 carbon atoms, a cycloolefin having 3-20 carbon atoms, and a cyclodiolefin having 3-20 carbon atoms.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplified embodiment, the polyolefin may be a copolymer of an olefinic monomer and an olefinic comonomer. Specifically, the polyolefin may be a copolymer of ethylene and an alpha-olefinic comonomer having 3 to 20 carbon atoms. More specifically, the olefinic monomer may be ethylene, and the alpha-olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

Preferably, the polyolefin may be a linear low-density polyethylene in which the olefinic monomer is ethylene, and the olefinic comonomer is 1-hexene, but it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 30% by weight.

The polyolefin according to an embodiment of the present invention may be prepared by a polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include aliphatic hydrocarbon solvents having 5-12 carbon atoms such as pentane, hexane, heptane, nonane, decane, and isomers thereof; aromatic hydrocarbon solvents such as toluene and benzene; and mixtures thereof, but it is not limited thereto.

EMBODIMENTS FOR CARRYING OUT THE INVENTION

Example

Hereinafter, the present invention is explained in detail with reference to the following examples and comparative examples. However, the following examples are intended to further illustrate the present invention. The scope of the present invention is not limited thereto only.

Example 1

A glass reactor in a glove box was charged with 7 mg of a first transition metal compound (M1) of Formula 1a above. 1.3 g of a 10 wt. % methylaluminoxane (MAO) solution in toluene was added thereto (Al/Zr=120), which was stirred at room temperature for 1 hour. Meanwhile, a 100-ml flask was charged with 2.0 g of silica (ES70, ENEOS), followed by the addition of 50 ml of purified toluene thereto. The first transition metal compound solution obtained above was injected into the silica slurry, which was stirred in an oil bath at 75° C. for 2 hours. The supported catalyst was precipitated at room temperature, and the supernatant was removed.

A glass reactor in a glove box was charged with 59 mg of a second transition metal compound (M2) of Formula 2a above. 6.3 g of a 10 wt. % methylaluminoxane solution in toluene was added thereto, which was stirred at room temperature for 1 hour.

The second transition metal compound solution was injected into the silica slurry on which the first transition metal compound had been supported, which was stirred in an oil bath at 75° C. for 2 hours. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Comparative Example 1

A glass reactor in a glove box was charged with 59 mg of a second transition metal compound (M2) of Formula 2a above. 6.3 g of a 10 wt. % methylaluminoxane solution in toluene was added thereto (Al/Zr=120), which was stirred at room temperature for 1 hour. Meanwhile, a 100-ml flask was charged with 2.0 g of silica (ES70, ENEOS), followed by the addition of 50 ml of purified toluene thereto. The second transition metal compound solution obtained above was injected into the silica slurry, which was stirred in an oil bath at 75° C. for 2 hours. The supported catalyst was precipitated at room temperature, and the supernatant was removed.

A glass reactor was in a glove box charged with 7 mg of a first transition metal compound (M1) of Formula 1a above. 1.3 g of a 10 wt. % methylaluminoxane solution in toluene was added thereto (Al/Zr=120), which was stirred at room temperature for 1 hour. The first transition metal compound solution was injected into the silica slurry on which the second transition metal compound had been supported, which was stirred in an oil bath at 75° C. for 2 hours. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Comparative Example 2

A glass reactor in a glove box was charged with 7 mg of a first transition metal compound (M1) of Formula 1a above and 59 mg of a second transition metal compound (M2) of Formula 2a above. 7.6 g of a 10 wt. % methylaluminoxane solution in toluene was added thereto (Al/Zr=120), which was stirred at room temperature for 1 hour. Meanwhile, a 100-ml flask was charged with 2.0 g of silica (ES70, ENEOS), followed by the addition of 50 ml of purified toluene thereto. The hybrid transition metal compounds solution obtained above was injected into the silica slurry, which was stirred in an oil bath at 75° C. for 4 hours. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Comparative Example 3

A 100-ml flask in a glove box was charged with 2.0 g of silica (ES70, ENEOS), followed by the addition of 50 ml of purified toluene thereto, and the silica was sufficiently dispersed. A glass reactor in a glove box was charged with 7 mg of a first transition metal compound (M1) of Formula 1a above. 10 ml of toluene was added thereto to obtain a first transition metal compound solution. The first transition metal compound solution was injected into the silica slurry, which was stirred in an oil bath at 75° C. for 1 hour. 1.3 g of a 10 wt. % methylaluminoxane solution in toluene was added thereto, which was stirred at room temperature for 1 hour. The supported catalyst was precipitated at room temperature, and the supernatant was removed.

A glass reactor in a glove box was charged with 59 mg of a second transition metal compound (M2) of Formula 2a above. 10 ml of toluene was added thereto to obtain a second transition metal compound solution. The second transition metal compound solution was injected into the silica slurry, which was stirred in an oil bath at 75° C. for 1 hour. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Comparative Example 4

A glass reactor in a glove box was charged with 4.3 mg of a first transition metal compound (M1) of Formula 1a above. 6.8 g of a 10 wt. % methylaluminoxane solution in toluene was added thereto (Al/Zr=120), which was stirred at room temperature for 1 hour. Meanwhile, a 100-ml flask was charged with 2.0 g of silica (ES70, ENEOS), followed by the addition of 50 ml of purified toluene thereto. The first transition metal compound solution obtained above was injected into the silica slurry, which was stirred in an oil bath at 75° C. for 4 hours. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Comparative Example 5

A glass reactor in a glove box was charged with 70 mg of a second transition metal compound (M2) of Formula 2a above. 6.9 g of a 10 wt. % methylaluminoxane solution in toluene was added thereto (Al/Zr=120), which was stirred at room temperature for 1 hour. Meanwhile, a 100-ml flask was charged with 2.0 g of silica (ES70, ENEOS), followed by the addition of 50 ml of purified toluene thereto. The second transition metal compound solution obtained above was injected into the silica slurry, which was stirred in an oil bath at 75° C. for 4 hours. The supported catalyst was precipitated at room temperature, and the supernatant was removed. Subsequently, the supported catalyst was washed three times with toluene and dried at 60° C. under vacuum for 30 minutes to obtain 2.5 g of a supported hybrid catalyst in the form of a free-flowing powder.

Test Example

Polyolefins were prepared in a fluidized-bed gas-phase reactor using each of the supported catalysts obtained in Example 1 and Comparative Examples 1 to 5. Specifically, ethylene and 1-hexene were copolymerized for 1 hour in the presence of 10 to 200 mg of each of the supported catalysts obtained in Example 1 and Comparative Examples 1 to 5 and 0.6 ml of 1 M triisobutyl aluminum (TIBAL) as a scavenger. The temperature inside the reactor was maintained at about 85° C., the pressure of ethylene was 14 kgf/cm$^2$, and the initial injection amount of 1-hexene was 5 ml. Hydrogen for controlling the molecular weight of the polymer was not added. The polymerization conditions are summarized in Table 1 below.

The physical properties of the polyolefins prepared using the supported catalyst in each of Example 1 and Comparative Examples 1 to 5 were measured, as follows. The results are shown in Table 2 and FIG. 1.

(1) Melt Flow Ratio (MFR)

It was measured at 190° C. under a load of 21.6 kg and 2.16 kg in accordance with ASTM D1238. Their ratio ($MI_{21.6}/MI_{2.16}$) was calculated.

(2) Density

It was measured in accordance with ASTM D1505.

TABLE 1

|  | M2/M1 (molar ratio) | Amount of supported catalyst (mg) | 1-hexene (ml) | Catalytic activity (gPE/gCat-hr) | $I_{2.16}$ | $I_{21.6}$ | MFR | Density (g/cm³) |
|---|---|---|---|---|---|---|---|---|
| Ex. 1 | 5 | 50 | 5 | 1,800 | 0.004 | 0.47 | 118 | 0.940 |
| C. Ex. 1 | 5 | 50 | 5 | 3,460 | 0.20 | 7.68 | 38 | 0.940 |
| C. Ex. 2 | 5 | 50 | 5 | 2,740 | 0.15 | 7.02 | 48 | 0.940 |
| C. Ex. 3 | 5 | 50 | 5 | 2,800 | 0.22 | 8.27 | 38 | 0.940 |
| C. Ex. 4 | — | 10 | 5 | 7,400 | 0.56 | 8.4 | 15 | 0.940 |
| C. Ex. 5 | — | 100 | 5 | 670 | ND | ND | ND | 0.930 |

As can be seen from Table 1 above, when the same amount of the catalysts was supported on a carrier, the MFR of the polyolefin obtained in Example 1, falling within the scope of the present invention, was significantly higher than the MFRs of the polyolefins of Comparative Examples 1 to 3 in which the loading sequence was changed.

Further, the MFR of the polyolefin obtained in Example 1 was significantly higher than the MFR of the polyolefin of Comparative Example 4, in which the first transition metal compound only was supported. The polyolefin of Comparative Example 5, in which the second transition metal compound only was supported, had too low $I_{2.16}$ and $I_{21.6}$ values, making it difficult to be measured.

From the above results, it is understood that, when the first transition metal compound is first activated and supported on a carrier, and the second transition metal compound is then supported, the characteristics of the second transition metal compound subsequently supported are expressed relatively strongly through the interaction between the first transition metal compound and the carrier, but the present invention is not limited by this theory.

INDUSTRIAL APPLICABILITY

The supported catalyst prepared by the preparation process according to an embodiment of the present invention is capable of preparing a polyolefin having a broad molecular weight distribution of bimodal characteristics and being excellent in mechanical strength and processability. In addition, in the preparation process according to an embodiment of the present invention, it is possible to adjust the strength, processability, and the like of a polyolefin to be prepared by changing the contents of the respective transition metal compounds.

The invention claimed is:

1. A process for preparing a supported hybrid metallocene catalyst for olefin polymerization, which comprises (1) mixing a first transition metal compound represented by Formula 1 with a first cocatalyst compound; (2) supporting the mixture of the first transition metal compound and the first cocatalyst compound obtained in step (1) on a carrier; and (3) mixing the supported catalyst obtained in step (2) with (3a) a mixture of a second transition metal compound represented by Formula 2 and a second cocatalyst compound, or (3b) a second transition metal compound represented by Formula 2, which is then mixed with a second cocatalyst compound, or (3c) a second cocatalyst compound, which is then mixed with a second transition metal compound represented by Formula 2:

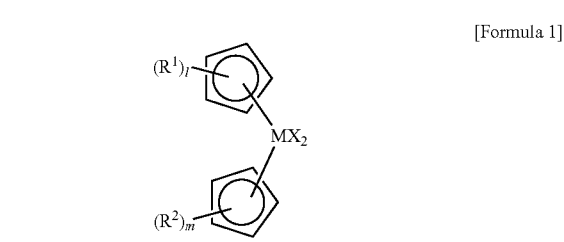

[Formula 1]

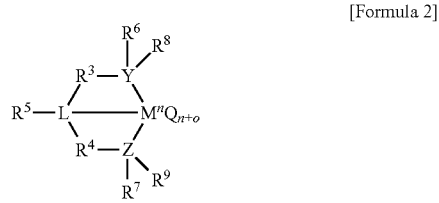

[Formula 2]

in Formulae 1 and 2, M is each independently titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, l and m are each an integer from 0 to 5, $R^1$ and $R^2$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R^1$ and $R^2$ are each independently capable of being linked to adjacent groups to form a substituted or unsubstituted saturated or unsaturated $C_{4-20}$ ring, Q is an anionic leaving group and is each independently hydrogen, hydrocarbyl, heteroatom or halogen, a straight or branched chain alkyl radical, or an alkenyl radical, an alkynyl radical, a cycloalkyl radical or an aryl radical, an acyl radical, an aroyl radical, an alkoxy radical, an aryloxy radical, an alkylthio radical, a dialkylamino radical, an alkoxycarbonyl radical, an aryloxycarbonyl radical, a carbomoyl radical, an alkyl- or dialkyl-carbamoyl radical, an acyloxy radical, an acylamino radical, an aroylamino radical, a straight-chain, branched-chain or cyclic alkylene radical, or a combination thereof, n is the oxidation state of M and is +3, +4, or +5, o is the formal charge of the YZL ligand and is 0, −1, −2, or −3, L is nitrogen,
Y is nitrogen or phosphorus,
Z is nitrogen or phosphorus,
$R^3$ and $R^4$ are each independently a $C_{1-20}$ hydrocarbon group or a heteroatom-containing group, wherein the hetero atom is silicon, germanium, tin, lead, or phosphorus, or $R^3$ and $R^4$ are capable of being linked to each other,
$R^5$ is absent or is hydrogen, $C_{1-20}$ alkyl, halogen, or a heteroatom-containing group,
$R^6$ and $R^7$ are each independently an alkyl group, an aryl group, a substituted aryl group, a cyclic alkyl group, a substituted cyclic alkyl group, or a multiple ring system, and
$R^8$ and $R^9$ are each independently absent or hydrogen, an alkyl group, a halogen, a heteroatom, a hydrocarbyl group, or a heteroatom-containing group.

2. The process for preparing a supported hybrid metallocene catalyst for olefin polymerization of claim 1, wherein, in Formula 1, M is zirconium or hafnium, X is each independently halogen, and 1 and m are each an integer of 1 to 3, and in Formula 2, M is zirconium or hafnium, Q is each independently hydrogen, a halogen, or a hydrocarbyl group, $R^3$ and $R^4$ are each independently a $C_{1-6}$ hydrocarbon group, $R^5$ is hydrogen or methyl, and $R^6$ and $R^7$ are each independently a substituted aryl group.

3. The process for preparing a supported hybrid metallocene catalyst for olefin polymerization of claim 2, wherein, in Formula 2, $R^6$ and $R^7$ are each independently a group represented by Formula 3:

[Formula 3]

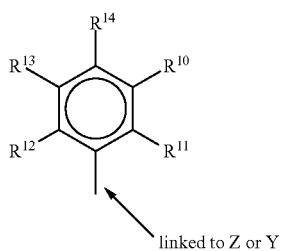

linked to Z or Y in Formula 3, $R^{10}$ to $R^{14}$ are each independently hydrogen, a $C_{1-20}$ alkyl group, a hetero atom, or a heteroatom-containing group having up to 40 carbon atoms, and two groups of $R^{10}$ to $R^{14}$ are capable of being fused to form a cyclic group or a heterocyclic group.

4. The process for preparing a supported hybrid metallocene catalyst for olefin polymerization of claim 3, wherein $R^{11}$, $R^{12}$, and $R^{14}$ are methyl, and $R^{10}$ and $R^{13}$ are hydrogen.

5. The process for preparing a supported hybrid metallocene catalyst for olefin polymerization of claim 2, wherein the first transition metal compound and the second transition metal compound are compounds represented by Formula 1a and Formula 2a, respectively:

[Formula 1a]

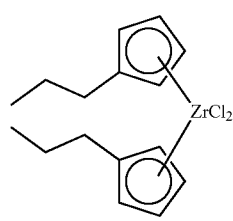

[Formula 2a]

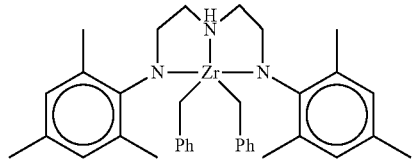

in Formula 2a, Ph is a phenyl group.

6. The process for preparing a supported hybrid metallocene catalyst for olefin polymerization of claim 1, wherein the first cocatalyst compound and the second cocatalyst compound each comprise at least one selected from the group consisting of a compound represented by Formula 4, a compound represented by Formula 5, and a compound represented by Formula 6:

[Formula 4]

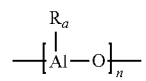

[Formula 5]

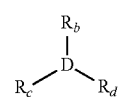

$[L-H]^+[Z(A)_4]^-$ or $[L]^+[Z(A)_4]^-$  [Formul 6]

in Formula 4, n is an integer of 2 or more, and $R_a$ may each independently be a halogen atom, a hydrocarbon group having 1-20 carbon atoms, or a hydrocarbon group having 1-20 carbon atoms substituted with halogen, in Formula 5, D is aluminum (Al) or boron, and $R_b$, $R_c$, and $R_d$ are each independently a halogen atom, a hydrocarbon group having 1-20 carbon atoms, a hydrocarbon group having 1-20 carbon atoms substituted with halogen, or an alkoxy group having 1-20 carbon atoms, and in Formula 6, L is a neutral or cationic Lewis acid, $[L-H]^+$ and $[L]^+$ a Brönsted acid, Z is a group 13 element, and A is each independently a substituted or unsubstituted aryl group having 6-20 carbon atoms or a substituted or unsubstituted alkyl group having 1-20 carbon atoms.

7. The process for preparing a supported hybrid metallocene catalyst for olefin polymerization of claim 6, wherein the compound represented by Formula 4 is at least one selected from the group consisting of methylaluminoxane, ethylaluminoxane, isobutylaluminoxane, and butylaluminoxane.

8. The process for preparing a supported hybrid metallocene catalyst for olefin polymerization of claim 6, wherein the compound represented by Formula 5 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

9. The process for preparing a supported hybrid metallocene catalyst for olefin polymerization of claim 6, wherein the compound represented by Formula 6 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl) borate, triphenylcarbonium tetra(p-trifluoromethylphenyl)borate, and triphenylcarbonium tetrapentafluorophenylborate.

10. The process for preparing a supported hybrid metallocene catalyst for olefin polymerization of claim 7, wherein the first cocatalyst compound and the second cocatalyst compound are the same.

11. The process for preparing a supported hybrid metallocene catalyst for olefin polymerization of claim 10, wherein the first cocatalyst compound and the second cocatalyst compound are methylaluminoxane.

12. The process for preparing a supported hybrid metallocene catalyst for olefin polymerization of claim 1, wherein the carrier comprises at least one selected from the group consisting of silica, alumina, and magnesia.

13. The process for preparing a supported hybrid metallocene catalyst for olefin polymerization of claim 12, wherein the first transition metal compound, the second transition metal compound, the first cocatalyst compound, and the second cocatalyst compound are supported on a single carrier.

14. The process for preparing a supported hybrid metallocene catalyst for olefin polymerization of claim 13, wherein the first transition metal compound, the second transition metal compound, the first cocatalyst compound, and the second cocatalyst compound are supported on silica.

15. The process for preparing a supported hybrid metallocene catalyst for olefin polymerization of claim 1, wherein the first transition metal compound and the second transition metal compound are supported such that the respective central metals are 0.01 to 0.20% by weight and 0.15 to 0.50% by weight based on the total weight of the finally obtained supported catalyst.

16. A supported hybrid metallocene catalyst for olefin polymerization, which is prepared by the process for preparing a supported hybrid metallocene catalyst for olefin polymerization according to claim 1, and which comprises a first transition metal compound represented by Formula 1; a second transition metal compound represented by Formula 2; a first cocatalyst compound; a second cocatalyst compound; and a carrier, wherein the contents of the central metals of the first transition metal compound and the second transition metal compound are 0.01 to 0.20% by weight and 0.15 to 0.50% by weight, respectively, based on the total amount of the finally obtained supported catalyst:

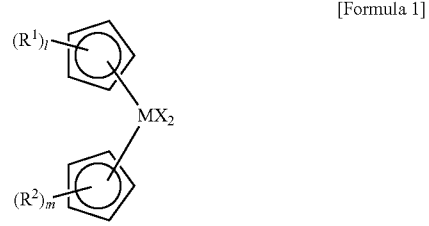

[Formula 1]

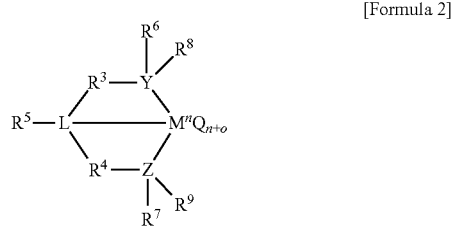

[Formula 2]

in Formulae 1 and 2, M, X, l, m, Q, n, o, L, Y, Z, $R^1$ to $R^9$ are as defined in claim 1.

* * * * *